United States Patent
Mertens (10) Patent No.: US 9,641,894 B2
(45) Date of Patent: May 2, 2017

(54) MAKING HDR VIEWING A CONTENT OWNER AGREED PROCESS

(71) Applicant: KONINKLIJKE PHILIPS N.V., Eindhoven (NL)

(72) Inventor: Mark Jozef Willem Mertens, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/427,019

(22) PCT Filed: Sep. 8, 2013

(86) PCT No.: PCT/IB2013/058384
§ 371 (c)(1),
(2) Date: Mar. 10, 2015

(87) PCT Pub. No.: WO2014/041471
PCT Pub. Date: Mar. 20, 2014

(65) Prior Publication Data
US 2015/0245096 A1    Aug. 27, 2015

Related U.S. Application Data

(60) Provisional application No. 61/699,935, filed on Sep. 12, 2012.

(51) Int. Cl.
*H04N 7/173* (2011.01)
*H04N 21/4627* (2011.01)
(Continued)

(52) U.S. Cl.
CPC ......... *H04N 21/4627* (2013.01); *G06F 21/10* (2013.01); *H04N 5/913* (2013.01);
(Continued)

(58) Field of Classification Search
CPC ............ H04N 21/266; H04N 21/2662; H04N 21/2665; H04N 21/44; H04N 21/440218
(Continued)

(56) References Cited

U.S. PATENT DOCUMENTS 8,395,993 B2 *  3/2013  Kimmich ............. H04L 1/0003
                                              370/235
9,271,052 B2 *  2/2016  Holden ............ H04N 21/23109
(Continued)

FOREIGN PATENT DOCUMENTS

| EP | 1827024 A1 | 8/2007 | |
|---|---|---|---|
| WO | 2011107905 A1 | 9/2001 | |
| WO | WO 0190860 A2 * | 11/2001 | ............. G06F 21/10 |
| WO | WO 2008121755 A1 * | 10/2008 | ....... G06F 17/30861 |
| WO | 2011042229 A1 | 4/2011 | |

OTHER PUBLICATIONS

Stutz et al: "A Survey of H.264 AVC/SVC Encryption"; IEEE Transactions on Circuits and Systems for Video Technology, vol. 22, No. 3, Mar. 2012, pp. 325-339.

*Primary Examiner* — James R Sheleheda (57) ABSTRACT

To allowed for increased security for selling HDR movies (or at least HDR experiences) even when some of the movie data gets pirated, an image transformation apparatus (201) is arranged to derive a e.g. a high dynamic range image (HDR_PRED) from a low dynamic range image (LDR_CONT) or any dynamic range image (e.g. a display driving image) from any dynamic range input image, wherein the derivation comprises tone mapping of lumas of pixels in the low dynamic range image into lumas of pixels of the high dynamic range image by applying at least one predefined mapping algorithm (gam), the image transformation apparatus comprising: -an input (204) to a data delivery system (205) comprising the low dynamic range image; -a data-secured input (206) to the at least one predefined mapping algorithm (gam) data; and -a control unit (202) arranged to manage access to the predefined mapping algorithm data (Continued)

under control of an owner of artistic content in the low dynamic range image, which allows for better control of the authorized regularity of the content when it is to be rendered, which is possible because of our special HDR image encoding strategy.

16 Claims, 2 Drawing Sheets

(51) Int. Cl.
- *H04N 21/4402* (2011.01)
- *H04N 21/2662* (2011.01)
- *H04N 21/254* (2011.01)
- *G06F 21/10* (2013.01)
- *H04N 5/913* (2006.01)

(52) U.S. Cl.
CPC ..... *H04N 21/2541* (2013.01); *H04N 21/2662* (2013.01); *H04N 21/440218* (2013.01)

(58) Field of Classification Search
USPC .................................................. 725/86, 90
See application file for complete search history.

(56) References Cited

U.S. PATENT DOCUMENTS

| | | | |
|---|---|---|---|
| 2006/0104533 A1 | 5/2006 | Daly et al. | |
| 2007/0098162 A1* | 5/2007 | Shin .................... | H04N 7/1675 380/201 |
| 2007/0201560 A1* | 8/2007 | Segall ................... | H04N 19/61 375/240.24 |
| 2008/0002776 A1* | 1/2008 | Borer ............... | H04N 21/23424 375/240.26 |
| 2009/0097558 A1* | 4/2009 | Ye ........................ | H04N 19/176 375/240.13 |
| 2009/0172744 A1* | 7/2009 | Rothschild ......... | H04N 5/44508 725/60 |
| 2012/0042379 A1* | 2/2012 | Diehl ..................... | G06F 21/10 726/19 |
| 2012/0128321 A1* | 5/2012 | Collar .................. | H04N 13/026 386/239 |
| 2014/0071348 A1* | 3/2014 | Muijs ..................... | G06T 5/007 348/584 |
| 2015/0208081 A1* | 7/2015 | Segall .................... | G06T 5/009 375/240.12 |
| 2016/0112715 A1* | 4/2016 | Hattori ................. | H04N 19/124 375/240.25 |

* cited by examiner

MAKING HDR VIEWING A CONTENT OWNER AGREED PROCESS

CROSS-REFERENCES TO PRIOR APPLICATIONS

This application is the U.S. National Phase application under 35 U.S.C. §371 of International Application No. PCT/IB2013/058384, filed on Sep. 8, 2013, which claims the benefit of U.S. Provisional Patent Application No. 61/699,935, filed on Sep. 12, 2012. These applications are hereby incorporated by reference herein.

FIELD OF THE INVENTION

The invention relates to apparatuses and methods and resulting products like data storage or transmission products or encoded signals, for allowing an improved secure delivery of high dynamic range images or video.

BACKGROUND OF THE INVENTION

Recently image capturing, displaying and in particular encoding has improved from so-called low dynamic range (LDR) imaging (such as classical systems like PAL or MPEG2) to so-called high dynamic range imaging (HDR). Illuminances in nature can range from 100,000 lux in sunlight, over typical office or room illuminations of around 500 lux, to e.g. 0.051× under quarter moonlight. Luminances (L) in the world range from 1 billion nit of the sun disk, to 10,000s of nits for lamps, to a couple of (ten)thousands of nit for objects in sunlight (like a building, cloud rims, or a white paper), to hundredths or 10s of nits for objects under (heavily) overcast sky or indoors, to 0.1 nit for a white paper under moonlight, etc. This doesn't necessarily mean one should render these luminances on a display in exactly the same way, rather, the picture should look artistically good, meaning at least that there should be approximately similar appearance differences for the regional luminances of objects when rendered on the display screen. One should understand that tone mapping for rendering on a particular display is with the many displays existing nowadays decoupled from either capturing or coding, leading to three linked representations. In general, a requirement of HDR imaging to be able to render e.g. a bright white wall differently from an adjacent bright lamp on a display, is that their respective pixels are also encoded with different luma (Y) values. Sensors or cameras are becoming more powerful in that indeed they can capture most of those many different luminances in the world faithfully (whether with larger well-depths, differently exposed pictures, etc.), and for simplicity we shall consider their native color representation to be a linear luminance encoding within [Lmin, Lmax]+ chromatic information. We may then use an entirely arbitrarily specified definition (according to desired requirements of course, such as e.g. later processability of the encoded information like local brightening, or data compression concerns, etc.) for our transmission codec. Lastly this encoded data (Y_C1C2, or similar) can then again be converted in many ways to a rendering-side representation, which we can for simplicity equate with driving values for e.g. the LCD pixel colors. Displays are getting more renderable dynamic range, so that they can firstly render more bright regions, and secondly simultaneously or successively more dark regions. This allows placing all these various luminance objects along the renderable gamut with optimal rendered output colors.

A considerable problem for content creators is that, despite their efforts to protect their content so that it can be duly sold instead of illegitimately copied, all kinds of pirates do distribute the content and sometimes in large numbers. When designing a new image encoding standard, apart from looking at how to represent pixel colors from e.g. a data compression point of view, one can have as an object simultaneously engineer in new requirements, such as protectability of the standard. We came up with a way to encode HDR images in such a way that they are actually represented as LDR images, plus a set of transformation strategies to recuperate from all the HDR effect information encompassed therein the original HDR image again. We can then relax the constraint of content protection somewhat. The image (texture/pixel) data itself may be hacked, but then the pirate has a lousy picture, not the original HDR master grading. The transformation strategy—which in our framework is at the same time a co-encoding of the master HDR graded image, and a legacy usable LDR variant—can then be protected strongly, e.g., this other half of the HDR information in our new codec can be transmitted securely only during viewing (and e.g. never go outside the hardware of an image processing IC if it also moves over data connections decrypted, and is deleted from within—IC temporal memory as soon as possible). This would allow applications with better control when the content creator wants to sell HDR movies, e.g. he may sell in fact only the HDR recuperation functions or algorithms.

SUMMARY OF THE INVENTION

The objects are realized by an image transformation apparatus (201) arranged to derive a first image comprising lumas which are coded to yield on a display of a first dynamic range the desired correct (e.g. not too bright facial colors, or boosted highlights, etc) luminances, the first image e.g. being high dynamic range image (HDR_PRED) for a 4000 nit display, or e.g. a 2000 nit reference peak white image when starting from an input image defined with respect to a higher reference peak white, the reference peak white defining what these lumas mean, in that the rendered luminances should be correct if displayed on such an display actually having a physical peak white reference of say 6000 nit corresponding to the reference peak white corresponding to which the input image data was defined, from a second dynamic range image (LDR_CONT), e.g. being a lower e.g. 100 nit dynamic range image in case of luminance upconversion from a lower dynamic range input image, but this could also be a higher dynamic range defined input image, e.g. a master graded signal with reference peak brightness of 6000 nit, in case the mapping is a downmapping to an optimal image for e.g. a 2000 nit physical peak white display, wherein the derivation comprises tone mapping of lumas of pixels in the low dynamic range image into lumas of pixels of the high dynamic range image by applying at least one predefined mapping algorithm (gam), the image transformation apparatus comprising:

an input (204) to a data delivery system (205) comprising the low dynamic range image;

a data-secured input (206) to the at least one predefined mapping algorithm (gam) data; and a control unit (202) arranged to manage access to the predefined mapping algorithm data under control of an owner of artistic content in the low dynamic range image.

One may want as tight and intermittent as possible the existence of the predefined mapping algorithm (gam) data, so that it is difficult to access, and even when copied, embodiments will make it difficult to actually use that data upon rendering, since that second phase is also always still present. There can be several scenarios in which the second image is (although it may contain the same information as to pixel texture) of lesser quality as to the brightness rendering impact. E.g. one may have a situation in which one converts with the mapping parameters a lower quality LDR image (e.g. as according to any standard which references luma codes to a 100 nit peak white) to a high quality HDR image, in which e.g. laser rays may have a high brightness, reflections on water may optimally sparkle when rendered on higher dynamic range displays etc. But also when the second image is already a higher quality image, e.g. a color encoding referenced to a master reference peak white of 6000 nit (i.e. theoretically optimal for rendering on an actual display of 6000 nit peak white, but not much higher or lower), then the mapping parameters may be to map towards a display of e.g. 2000 nit or around that peak white, and e.g. second mapping parameters may be used for deriving a (more) optimal rendering image on displays in a range of 2500-3500 nit peak white, i.e. around 3000 nit. We will describe the principles below non-limitatively with a LDR-to-HDR conversion example, the skilled person of course understanding how then per swapping the same technology works in the other direction of color/luma mapping. I.e., various embodiments can always check whether everything is regular and authorized, upon each use of the mapping data. I.e. this system makes non-regular use so difficult, unless of course one builds entire systems, but users typically buy a regular image transformation apparatus, or display, which can then be made to tightly behave according to the authorized method. By this one can even relax the system, in that in some embodiments the predefined mapping algorithm (gam) data may be relatively freely available, but that the regularity of the situation is still checked by the image transformation apparatus (201) during or prior to each rendering. The control of the owner can be realized in various ways (in fact the owner need not necessarily be the copyright owner perse, as the control may have been delegated, but someone or some apparatus functioning for the benefit of someone has to give the go-ahead that the mapping data for making the HDR may be released), but the control unit has to check it. E.g., the owner may indicate that this content is free (this may e.g. be information which was broadcasted previously, and stored in a memory of the image transformation apparatus), in which case the mapping data might be retreived from any server or source (in such scenarios it may be that one only needs to make a connection to the standard server of the movie production company to see that this movie title is free (and any furhter information relating to it may be obtained for free, without any further interference, after this check). Of course, more complicated specifications of what rights one has regarding the image content (e.g. which servers, or entities are allowed to supply mapping data) may also be specified by the server, or e.g. such owner's desires as presaved in memory of the image transformation apparatus from an earlier communication session. E.g., a set of handling rules could be specified for copying preloaded mapping data to another device of a user in the same domain (e.g. when connected for on-the-fly checking of aspects with the image transformation apparatus), e.g. that this second apparatus should also do some checks with the server, be it in synchrony with a communication from the image transformation apparatus or not, etc.

Advantageously, an image transformation apparatus (201) has the control unit (202) arranged to obtain the at least one predefined mapping algorithm data via the data-secured input (206) in a time interval around the time of rendering on a display of the high dynamic range image (HDR_PRED). Removing all traces of the mapping algorithm, even from memory deep within the hardware, can increase security for some scenarios. E.g., one cannot reverse engineer any device.

Advantageously, an image transformation apparatus (201) has the control unit (202) arranged to form a private secured connection over a network such as the internet, with a server (207) of the owner of artistic content. Although many systems will not need such tight security, one could implement communication measures avoiding evesdropping, even if other measures make the stolen mapping data less or unasable, e.g. because it is matched to a certain display or image transformation apparatus.

Advantageoulsy, an image transformation apparatus (201) has the control unit (202) arranged to send content identification data (id_rend) identifying at least aspects of the low dynamic range image (LDR_CONT) such as e.g. a version number or where it was purchased, and optionally in addition identification data of the image transformation apparatus (201) or a HDR display (290) or an owner of those apparatuses. By identifying the situation of the rendering each time, the server 207 has increased opportunity to assess the situation. E.g., if suddenly the user, and content, and/or apparatuses do not match anymore, perhaps somehow content was copied, and is being used irregularly. Of course if the user regularly resold his content to a new owner, he may have registered so on the server (but then e.g. the apparatus specifics may be checked at first play of that content, and be overwritten so that next time the situation won't be judged as inappropriate).

Advantageously, an image transformation apparatus (201) has the control unit (202) arranged to store the at least one predefined mapping algorithm data in a memory (270) in an encrypted manner, which memory may be fixed or detachable. Some users or scenarios may not want regularity checking at each rendering, but e.g. once, in a so-called initialization of the content. This can be arranged by e.g. storing the mapping data, again in as secure as possible or desirable a manner.

Advantageously an image transformation apparatus (201) has the control unit (202) arranged to obtain characterizing information from a user of the high dynamic range image (HDR_PRED), such as e.g. a personal code or biometric information. To make the system more secure, e.g. by allowing the server 207 to do more in depth investigations, some embodiments may obtain, and even only work if they obtain, various additional data regarding the rendering situation.

Also, a predefined mapping algorithm data (gam, gam_enc) supplying server (207) is arranged to receive a data connection opening from any variant of the image transformation apparatus (201), and is arranged to perform a test based on transmitted content identification data (id_rend) from the image transformation apparatus (201) testing whether the low dynamic range image (LDR_CONT) is regularly purchased or obtained, and arranged to thereupon supply the predefined mapping algorithm data (gam, gam_enc) to the image transformation apparatus (201). The server will do a simple or more complex test before it releases, for single use or forever for that hardware rendering situation, the mapping data. Typically it at least wants to do some simple tests on how the content was obtained, e.g. it may verify that it contains an identifier stating that this content was given away massively for free, or was considered to be no longer copyright-enforced. But the content may also have been distributed (as a teaser e.g.) so that later on people would buy the mapping data for the HDR experience. Or the content may previously have been transmitted by server 207 itself, or a known server etc. In more complex variants the server may do more tests to assess the situation, and not supply the mapping parameters if it judges the situation is irregular, or start a process where it offers the user to regularize the situation, e.g. give more information making the server confident that he is a regular user and/or did a regular purchase, e.g. based on a predefined questionnaire showing on the display.

Advantagously a predefined mapping algorithm data (gam, gam_enc) supplying server (207) is arranged to perform further tests, specifically whether the image transformation apparatus (201) is a regular apparatus or an inappropriately behaving one. This can be done in various ways. E.g., the server may test whether it is releasing the mapping data to a device engineered by the hacker, mimicking a regular image transformation apparatus (201) from a consumer electronics manufacturer. A simple way to do this is to agree secret codes identifying e.g. that the apparatus was constructed by Philips, which code is then sent by the control unit. Various further testing can be done, which allow estimating whehter one is talking to a recently soldered PCB emulator, or some emulation software etc., e.g. the server could check whether its communications enter a particular IC etc.

Advantageously a predefined mapping algorithm data (gam, gam_enc) supplying server (207) is arranged to maintain a precise temporal communication with the image transformation apparatus (201) of partial information of the predefined mapping algorithm data (gam, gam_enc). If the mapping data is sent at intervals, this not only allows making copying more difficult, but it can also allow further tests. E.g. a copier may require the data to be sent more quickly, be it whether he is in a hurry to not be discovered and blocked, or whether he has insufficient specifics about the agreed temporal order of data supply (e.g. send the data for the first three scenes, and then nothing until right before the fourth scene, or no later than 10 seconds before the fourth scene). Whether this is kept secret or not, not all pirates may take the trouble building a system which emulates all such possibe aspects, which would mean they can at past have a HDR experience for part of the movie, making that they can create good publicity teasers.

Advantageously a predefined mapping algorithm data (gam, gam_enc) supplying server (207) is arranged to analyze a situation at the rendering side based on information on at least one aspect of {the low dynamic range image (LDR_CONT), the image transformation apparatus (201), a connected HDR display (290) for rendering the high dynamic range image (HDR_PRED), optical characteristics of an environment of the HDR display (290), and a user of the image transformation apparatus (201)}, and therefrom determine which, if any, predefined mapping algorithm data (gam, gam_enc) to send to the image transformation apparatus (201). Depending on all aspects desired, some embodiments could send various data, be it at least for monitoring and logging how regular and irregular content gets distributed, even if the supply of the mapping data is simple.

Aspects of our invention can further be realized by a method of deriving a high dynamic range image (HDR_) from a low dynamic range image (LDR_CONT), wherein the derivation comprises tone mapping of lumas of pixels in the low dynamic range image into lumas of pixels of the high dynamic range image by applying at least one predefined mapping algorithm (gam), the method comprising:

obtaining from a data delivery system (205) the low dynamic range image; and managing access to the predefined mapping algorithm data obtained via a data-secured input (206) under control of an owner of artistic content in the low dynamic range image, and a method of supplying predefined mapping algorithm data (gam, gam_enc) for transforming a low dynamic range image (LDR_CONT) optimal only for LDR display rendering into a high dynamic range image (HDR_PRED) optimal for HDR display rendering, by a source of such predefined mapping algorithm data (gam, gam_enc) connectable to an image transformation apparatus (201) having a control unit (202) arranged to manage access to the predefined mapping algorithm data under control of an owner of artistic content in the low dynamic range image, the method performed by the source testing whether the image transformation apparatus (201) is using an authorized low dynamic range image (LDR_CONT), and under positive verification transmitting to the image transformation apparatus (201) the predefined mapping algorithm data (gam, gam_enc).

Advantageously the method of deriving a high dynamic range image (HDR_PRED) makes a private secured connection over a network to a server (207) in a time interval around the time of rendering on a display (290) of the high dynamic range image. Especially if the mapping data goes immediately deep within (tampering-protected) ICs, and is destroyed as soon it is not needed anymore, could one make very secure systems. But one could of course vary on the different components and protective measures, to make less strict management systems for the mapping data, and the resulting ways in which one can or cannot make HDR image(s).

Advantageously the method of deriving a high dynamic range image (HDR_PRED) has a control unit (202) at the location of rendering the high dynamic range image (HDR_PRED) which sends content identification data (id_rend) identifying the low dynamic range image (LDR_CONT) to the server (207). The more data is communicated about what the specifics are at the rendering side, the more inference can the server of the content owner make, such as allowing certain information under certain conditions, supplying other more suitable mapping data, etc.

Advantageously the method of supplying predefined mapping algorithm data (gam or gam_enc) for transforming a low dynamic range image (LDR_CONT) optimal only for LDR display rendering into a high dynamic range image (HDR_PRED) analyzes aspects of the rendering situation as identifiable from information about that rendering situation received via a control unit (202) at that rendering side. As said, the server can infer various things based on the types of information it gets, e.g. try to track how a user obtained certain e.g. pirated data (e.g. if a lot of the same pirated movies appear, the server can try whether he can also download them—e.g. if the image transformation apparatus had (temporally) stored the website it downloaded the movie from it may communicate such to the server). Of course other variants of the apparatus may not want to store or disclose so much information. The transmitted information may be to a larger extent determined on the initiative of the image transformation apparatus, or upon requests from the server.

The communicated mapping algorithm data can be delivered (and where applicable sold) based on various specifying signals or encodings, stored on various physical media, etc.

BRIEF DESCRIPTION OF THE DRAWINGS

These and other aspects of the method and apparatus according to the invention will be apparent from and elucidated with reference to the implementations and embodiments described hereinafter, and with reference to the accompanying drawings, which serve merely as non-limiting specific illustrations exemplifying the more general concept, and in which dashes are used to indicate that a component is optional, non-dashed components not necessarily being essential. Dashes can also be used for indicating that elements, which are explained to be essential, are hidden in the interior of an object, or for intangible things such as e.g. selections of objects/regions (and how they may be shown on a display).

In the drawings.

DETAILED DESCRIPTION OF THE DRAWINGS

Figure 1:
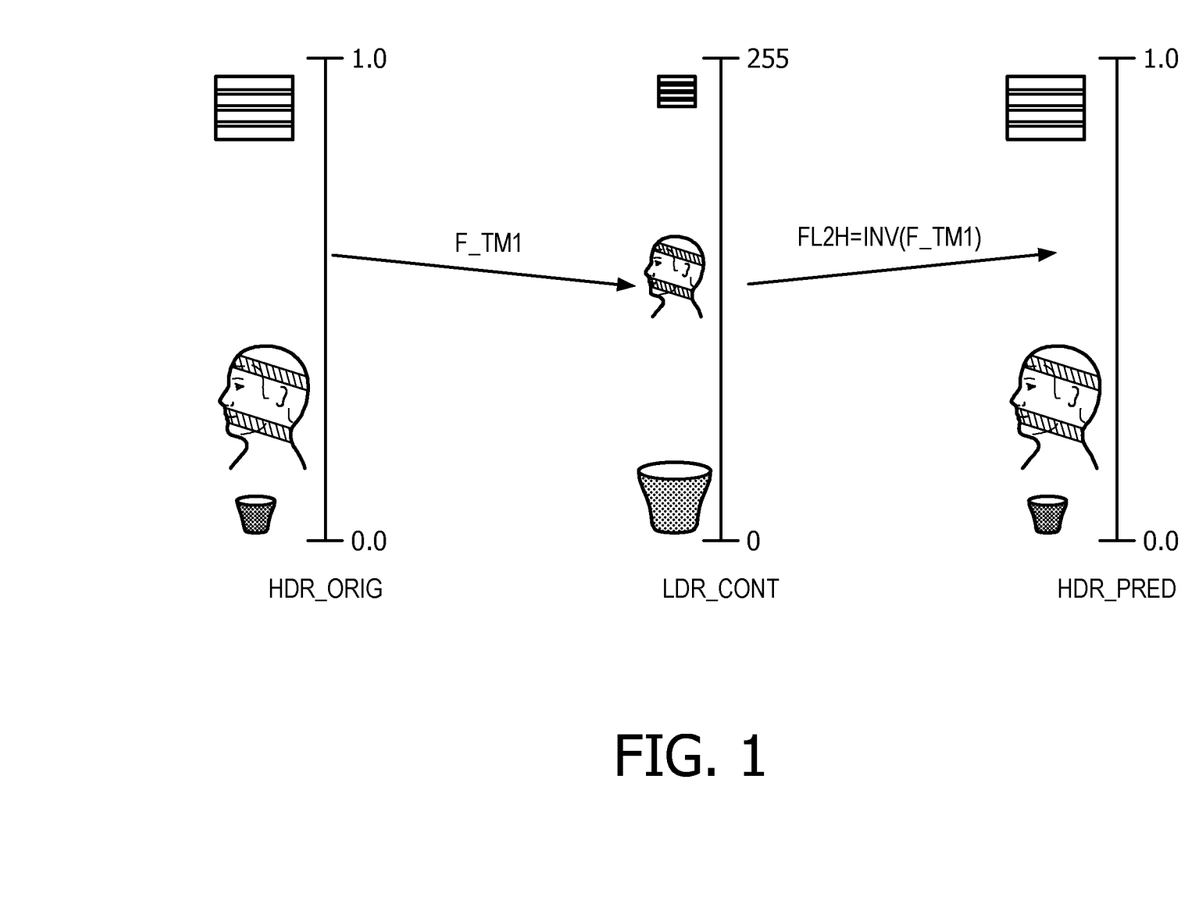
FIG. 1 schematically illustrates how we encode an HDR image as actually an LDR image, which is usable on an LDR, but not with sufficient visual quality on an HDR display, unless one obtains the mapping algorithm data of our encoding method.
Figure 2:
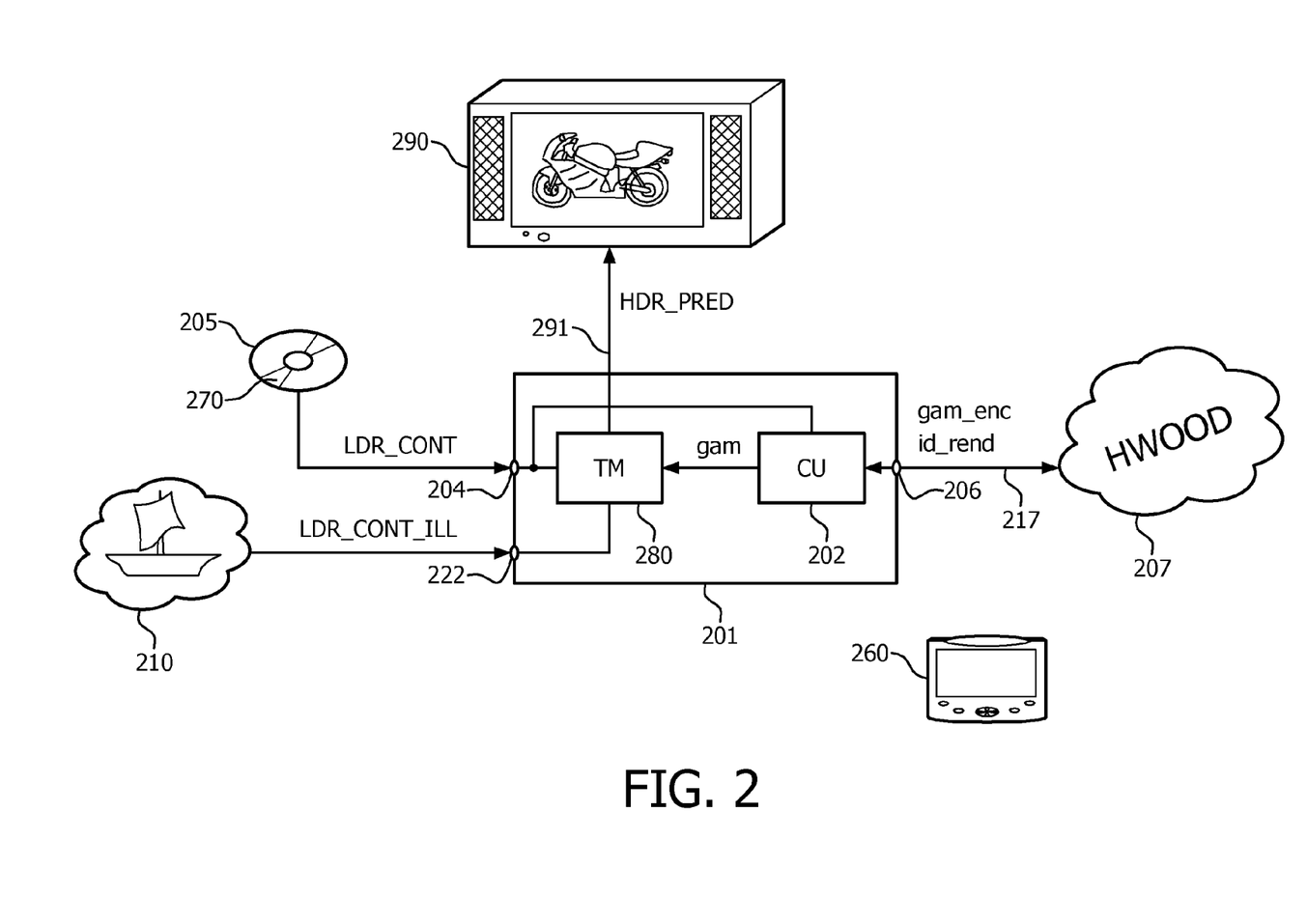
FIG. 2 schematically illustrates one of the various image transformation apparatuses arranged to communicated, preferably around the moment of rendering the HDR image, with typically a server of the content owner, delivering the required mapping algorithm data under the right secure conditions.

FIG. 2 schematically shows a rendering system allowing the rendering of HDR image(s) under increased control of the artistic content owner. We have as an example elucidated the image transformation apparatus 201 of our claimed invention as e.g. a settopbox or any consumer side apparatus having image processing capability. The reader will of course understand that, depending mainly on what degree of security is desirable for any particular application, this configuration may be embodied in different ways. E.g. in a tightly secure system, everything (from the communication handling unit communicating with the memory storing the mapping algorithm via the data-secured input 206, including the actual tone mapping unit 280, and even possibly signal formatters for calculating the actual display driving signals) may be included in the display itself, even in a single IC. The data-secured input may then e.g. be a pin or a bus of that IC, e.g. connected to an antenna. If a hacker would e.g. tap display driving signals coming out of some of the IC's pins, this information would be largely unusable for him in view of the display-dependency. But of course when less tight security suffices, one could send the HDR image HDR_PRED itself, e.g. in a standardized encoding, whether over an internal bus of the display, or as in the exemplary elucidation of FIG. 1, a generic video communication link 291 like e.g. a HDMI connection. In such a case the HDR image may of course be encrypted by an agreed algorithm between settopbox and display. Indeed, the image transformation apparatus 201 may even be a professional apparatus, which may e.g. be used in a shop offering a movie buying service, or on a server side of an image/video distribution system, etc.

We will first with FIG. 1 explain how our method of encoding HDR images/video works. The content creator, e.g. a Hollywood movie studio, has made a master grade original HDR signal HDR_ORIG, which may be encoded e.g. with a codec having a 20 bit linear luma representation. This image is HDR because it is so graded that it will look optimal on displays having at least higher luminance (typically above 1000 nit peak white), and usually also deeper blacks, higher color rendering precision etc. (we will focus the explanation for simplicity on the luma/luminance component of the image pixels, but of course typically a system will also do color mapping to arrive at optimally rendered colors). Such a signal is not simply usable on a legacy LDR display. Firstly because it is inappropriately encoded. In our approach we typically encode images, so also the HDR images in a backwards compatible manner, so with 10 bit or even 8 bit luma. Ignoring the actual pixels colors, such an image may then be compressed and handled by a classical image transmission system, e.g. by MPEG2, AVC, VP8, JPEG, etc. encoding. But, the actual pixel colors are important too, and this is where our encoding method adds a second phase, otherwise it would go wrong. We encode the HDR image in such a way that it is directly renderable on a legacy display, in other words, it would look of sufficient visual quality on such a display (the colors of the image objects reasonable approximating what they would look like in an original scene, or at least as best as an LDR display could render such, given however an important constraint of not losing the HDR image effect information in that signal). We therefore apply transformations which in principle are reversible (i.e. mapping from HDR_ORIG to LDR_CONT can be undone, to obtain HDR_PRED from LDR_ORIG by applying the inverse luma/color mapping strategy), or at least, such that from our obtained LDR encoding LDR_CONT, we can perfectly (or at least with minimal error) retrieve as a mapped estimate HDR image HDR_PRED, the original master grade HDR_ORIG. This means that the algorithms doing the luma (and color) mapping should be such as not to destroy the HDR information. To emphasize this important point more precisely: that HDR information, although not perfectly renderable (e.g. one may cram together some darker parts of the image so that they are not discriminatable for the eye anymore on a low peak brightness LDR display under typical surround conditions), is still recoverable by applying the mapping algorithms (the lumas 10, 11, 12, . . . 15 could e.g. be mapped to HDR lumas 25, 30, 48, . . . 100, especially if not too many artefacts like banding are thereby visible in the estimated/reconstructed by mapping HDR image. So although we may say that LDR_CONT is an LDR grading/image, it is a special one in that it still contains—because we used the appropriately constrained mapping to link HDR_ORIG and LDR_CONT—(at least nearly) all the HDR information of the master grade HDR_ORIG.

Not applying such a corrective luma mapping to even an 8 bit encoding of HDR_ORIG, would result in unusable images for legacy devices, as they would look too distorted colorimetrically. E.g., one may have a dark basement scene with bright highlights. Since a high peak luminance HDR display can render the lower luma pixel codes with relatively high output luminance, we may allocate low pixel lumas to all these pixels (e.g. 0 . . . 10), and then have no pixels with intermediate lumas, and values (250-255) for the bright lights (if we were to encode an HDR grade in an 8 bit representation). Showing this signal on an LDR display however binarizes it. All the dark values are typically seen as the same black. So we need to apply a luma mapping F_TM1 which prebrightens the darker lumas (e.g. 0 . . . 5 becomes 10 . . . 20, with an additive and multiplicative mapping), so that the dark room is still visible on the LDR display when this HDR encoding is directly rendered as if it was an LDR image. So we encode the HDR image as if it was an LDR image, or in other words, we encode the HDR and LDR image with the same picture representation. But, this LDR_CONT image is not directly usable to render the correct master grade HDR_ORIG on a HDR display. Since we have e.g. brightened the dark parts of the room so that they will look discriminatable on an LDR display, they will look very bright on a HDR display, and lose all scary mood as intended by the content creator. The solution to get them correct again, is in the inverse luma mapping algorithm FL2H.

This algorithm gam may in some scenarios be as simple a applying a single gamma function (e.g. HDR luma Y_HDR=a*Y_LDR^g), even for an entire scene or movie, or it may be more sophisticated taking also local color optimization into account since the visual system sees color appearances relatively. E.g., a coarse segmentation strategy may define some thresholds before sets of blocks in an image. In zig-zag scan before block (X,Y) one uses a first luma mapping function, then before block (X,Y) two LDR luma thresholds g_l and g_h are specified, indicating that for regions at positions from (X,Y) onwards having pixel lumas in between these boundaries, should be treated differently, e.g. with a second luma mapping strategy/algorithm. E.g. if an LDR luma Y_LDR equal to 128 was mapped to Y_HDR=2099 (in some agreed representation, e.g. 20 bit; for simplicity in the Figure we have made the range of reconstructed HDR lumas a float [0.1] range) by the first luma mapping function, it can now by the second mapping algorithm be mapped e.g. to Y_HDR=200. E.g. one may process the whites of a shirt so that they don't glow too much. Later on in that same picture after block (X+K, Y+L), there may be the same range of Y_LDR values in the LDR image representation LDR_CONT, but this may be a very bright lamp. It can be processed differently to yield very bright Y_HDR lumas by means of a third local mapping algorithm.

In any case, all the information of the mapping algorithms (functional parameters, image numbers such as e.g. presentation times, local shape definition information, etc.), are the key to obtain the original master grade HDR_ORIG again, or at least an HDR grade HDR_PRED which looks (very) close to it. This grade will look as intended, optimal on a reference HDR display, or any bright display having physical characteristics close to the reference HDR display, and not e.g. too bright at certain positions, or in general of incorrect color.

Now our system allows the content creator to specify which mapping algorithms are to be used to obtain the best look, in fact their master grade. They could e.g. specify different mapping algorithms for different HDR displays, as one can imagine one may use a different mapping for mapping a bright sunny exterior through a window on a 1000 nit display versus a 25.000 nit display. So this way already the rendering can be tailored by the content owner (this already making pirating less easy, since the pirate must accumulate all versions of the mapping, since otherwise if he sends the wrong one to a new display, the final result may still be far from optimal, not giving the full quality content-creator-intended experience). And this even allows for the creator specifying some different looks for some reasons (e.g. one could envisage a cheaper look, which is kind of half-HDR). But furthermore, having all this visual quality in this/these mapping algorithms allows the creator the implement vastly increased content protection in addition to existing measures, and therefore get fair return value on his effort. Of course the user can opt for viewing a low quality version by putting any pirated LDR version (e.g. a LDR_CONT extracted somewhere from a regular system) on his HDR display, and indeed will do so if excessive prices are asked for the HDR experience. But if he wants the optimal experience, with our present system he will do so under agreement of the content owner, there being several variants balancing security with ease of use.

Now returning to FIG. 2, we will elucidate some of the possible embodiments. So the basic image transformation apparatus 201 inherent in all embodiments has firstly access over an input 204 to a data delivery system 205 comprising the LDR_CONT image(s). As an example we have shown a purchased blu-ray disk. Interestingly, even though the user has purchased this disk, in some embodiments he still does not have the full information for HDR rendering, although the disk states it's a HDR disk (of course he can always watch it in legacy mode, e.g. on an LDR display). The control unit takes care of this, e.g. upon each insertion of the disk. The skilled reader understands that the data delivery system can have many other forms, e.g. it may be a network connection to a video providing server. It identifies that the disk is a (regularly purchased, allowed) disk, an may e.g. extract a unique identification code. Optionally a (mobile) device 260 (connected or connectable) with data entry capabilities may be used to input e.g. a unique code as already currently present on software. This device could even have increased protective measures, e.g. communicating via the server 207 of the content owner for acknowledgment that it is the device of a regular user (and blocking devices which are e.g. uniquely allocated to the display in case of improper use, like attempts to pirate). The control unit communicates with the server 207 of the content owner, and relays this information. This server can then determine whether the user wants to render a duly purchased product (e.g. from another server of the content owner, or some organization allowed to distribute copies, such as e.g. LDR versions on youtube), or one obtained from a pirate video source 210. In fact, some embodiments of the apparatus would also allow to legitimize inappropriate content. Even if the user has obtained the image(s) from the pirate video source 210 (e.g. via another image data input 222), the server may offer to pay for the mapping algorithms (gam) before viewing e.g. via the mobile device which may be a mobile phone or laptop, after which the mapping algorithms are sent anyway. Some embodiments of the control unit and/or server may further identify by checking which LDR_CONT the user has, whether they should send him a better quality version (e.g. if the content came from analog camera capturing of some rendering, the color behavior will be way off the desired values). But if the HDR image(s) were not duly paid for, the apparatus will not give the required mapping algorithms, and may even do some further actions, like investigating the situation and accumulating system data, notifying the user of his inappropriate behavior, etc.

After having received the mapping algorithm data, whether raw (gam) or encrypted (gam_enc) according to some agreed algorithm, the tone mapping unit 280 may transform the LDR image LDR_CONT into the HDR image HDR_PRED, and start rendering on display 290. The connection 217 may be of various forms depending on the requirements. An interesting variant is where the apparatus (e.g. incorporated in a display, such as a television) request the mapping algorithm roughly at the time of desired viewing, i.e. within a time interval around the rendering time. This time interval may be specified by the system, e.g. confirmed upon request from the control unit 202 by the server 207, and e.g. be a couple of days in advance. But in a tighter security system, the control unit will be informed that the interval time is e.g. 10 minutes in advance, and that in case of non-use, it has to delete the algorithm data within 2 hours. So in some embodiments, each time one wants to render, one should make contact with server 207, e.g. with an internet connection of the television. One may make such connections of various security level, e.g. one could even make an https (Hypertext Transfer Protocol Secure) connection or similar secure communication mechanism, again diminishing opportunities to hack anywhere. The mapping algorithm parameters may also instead of being all preloaded before starting the movie, be downloaded for low latency networks 207 little before they are needed, e.g. a couple of seconds or minutes before a scene changes, needing another mapping strategy. Some embodiments of the image transformation apparatus 201 may be arranged so that they not only need this mapping data in the correctly timed fashion, but even via some external (possible even predetermined network-to-server) connection, making hacking very difficult (since one doesn't need only the different mapping algorithms, but also need to supply them via an add-on pirated device which emulates the correct obtaining; and since this may need to be connected to a pin(s) of an IC internally in the display rather than attached to e.g. a USB bus, such highly secure embodiments may be far too sophisticated for the average user to realize in massive amounts). The skilled person understands the various ways in which the correct time synchronization of the LDR images and mapping can be implemented, e.g. with the image data store and/or signal (e.g. BD disk, signal from memory stick or remote video server, etc.) may comprise timing codes identifying and requesting "just a new" or specific mapping algorithms, with the server 207 typically knowing (from e.g. transmitted presentation time stamps) which mapping data is needed, or the server may manage all this autonomously, and actively instruct the control unit and/or supply it with new mapping algorithms. So a number of things may happen via the control unit. I may e.g. request a new kind of mapping strategy after the user has dimmed its viewing room light, or, on the other side of the spectrum, it may simply display a message that HDR viewing is not possible or allowed, and typically suggest steps which can be undertaken to end up with a renderable HDR image. So the control of the content owner may be as simple as a simple "go ahead", typically realized as some of many possible strategies of supplying the mapping algorithm data to the control unit, or it may entail a complex determining situation, in which the server 207 analyses particulars of the user's viewing situation (such as e.g. the illumination in his viewing room), and then proposes a real-time optimized mapping algorithm(s) for optimal rendering on his HDR display. Thereto in the various embodiments the control unit may send (on its own, but typically on the server 207's intention), depending also on what is agreed based on such considerations as e.g. privacy, a number of data values to the server 207. E.g., the control unit may quickly analyze the video, and check whether the statistical distribution of the lumas in LDR_CONT is as it is supposed to be (in one or one of several existing variants of the image content), or it may analyze a watermark in the data, to obtain more information on the source of the content (e.g. was it copied from a distribution to a particular cinema). It may read administrative information stored or entered in the system, like the address from the vendor, etc. When desirable, various methods can be used to identify the purchase with the present rendering, e.g. the control unit could ask the user whether the HDR movie (or actually LDR_CONT) purchase was done by credit card (or just remind him it was), and ask the last four digits, something difficult to do for a hacker, unless he also monitored that purchase, or it was his own purchase (but at least it avoids stealing someone else's copy which viewing might be disabled for the regular user in some systems). Our embodiments at the same time restricting the rendering use of the movie (e.g., no regular signal out may be present, and the apparatus 201 could stop functioning if its enclosure is opened or modified), make it difficult to do anything but self-viewing even if a pirate masks as a regular user, and regularly pays for one copy. All kinds of further information may be stored identifying how this (to be rendered only) content was obtained, which might lead to strange results if it was copied e.g. by monitoring some signal somewhere. E.g. it may be logged that a regularly purchased LDR_CONT should reside with a particular display (or a number thereof, allowing e.g. viewing at the place of a known and registered/identifiable friend), and not at another site. In many scenarios it will e.g. not be needed that the user gives any specifics of the purchase (like credit card digits), since the system will be so configured that it is sufficiently clear that the content was regularly purchased, but the embodiments may be useful in other scenarios.

But secondly, the server 207 could obtain (typically upon explicit agreement from the user) information from the user itself, e.g. his name stored in a memory in the image transformation apparatus of HDR display 290, or a password for starting the system, or the user inserting a smart card, etc. Advanced apparatuses 201 could establish at least the identity of the user by e.g. using a fingerprint sensor, which may already be built-in. The control unit need not actually send all characteristics of this fingerprint to the server 207, but only a summary of the data such as "the_usual_viewer_is_using_the_system". But more advanced systems could monitor that if someone is viewing a movie more than e.g. 20 times, he might be a pirate rather than someone really loving that movie, especially, if that same version (if fine grain identified per user or group of users) is being watched at other physical locations, and even the same times too. I.e. the server 207 may implement some monitor strategies in some embodiments besides providing more tightly secure data distribution, and request the necessary data from apparatus 201. Thirdly, the server may obtain all kinds of information regarding specifics of the rendering system (e.g. peak brightness or electro-optical transfer function of the display, surround illumination characteristics), etc. The former data is typically for registering and/or allowing the HDR rendering (or monitoring aspects of what goes not according to regular use of the system), whereas the third kind of parameters may aid in optimizing the HDR rendering experience by transmitting the most appropriate mapping algorithm parameters, if several variants exist (which could even by calculated on-the-fly). Of course fourthly, all kinds of information may be communicated on whether either the server 207 or the apparatus 201 are regular, e.g. to avoid a pirate video supplier emulating an entire content owner validation service, and this may e.g. done by hard-coding a number of internet addresses in the apparatuses 201.

Other embodiments of lesser security may offer some more freedom to the users. Although many apparatuses like e.g. televisions may have access to a least some network like e.g. an internet connection, it may be that some users (e.g.

less sophisticated ones), may just want some final content, e.g. on a BD they can also play (in HDR) on a display system which doesn't have a network connection (e.g. in the back of their car). Thereto, some embodiments may allow to store the mapping algorithms in some memory 270 (whether deep in the apparatus 201 or display or on a detachable, portable memory), e.g. on a writable part of the BD or secure memory stick, typically of course in a tightly encrypted manner. E.g. keys may be used based on passwords, or even times of downloading the algorithm data. A typical system may connect the e.g. portable display (whether actually via being present on a connected cable, or by exchanging data later via a memory stick) to the image transformation apparatus 201, and then define an encryption strategy for the disk and the portable display at that time. E.g., the mapping algorithm data on the disk may be encrypted based on a generated key which is only in the hardware of that portable display. Having a unique key for a particular display (and means of managing and generating such (e.g. the key may be partially generated on the basis of an identifier in the display)) again makes hacking very difficult, since even if one copies the mapping data, it may be unusable. Depending on how strong a data protection typically the content owner (usually in agreement with the apparatus manufacturer, and hopefully some representation of the users) may want, the system may even only work if the correct user password is giving (otherwise a compliant HDR display or image transformation apparatus doesn't even read, hence cannot use, the mapping algorithm data), but on the other side of the spectrum one could also consider the system sufficiently protected with minimal encryption of the mapping algorithm data (or for some hardware configuration even no encryption for regular users, e.g. if the parameters are at single initialization time written directly in an internal memory of the portable display, typically with an identifier of the image(s)/movie they apply to). So this regularization act may happen once, e.g. at the moment a user buys a disk, he immediately regularizes it at home, where he has all necessary technical components (and written down passwords or whatever) available. Some users may however not desire that, e.g. when they buy content on holiday which they immediately want to see it, or when they have an insufficient system (e.g. no internet at home), etc. For these users an embodiment of the image transformation apparatus may be placed in a shop. During purchase one e.g. regularizes a "blank" BD (i.e. one which only contained the LDR encoding LDR_CONT, but not the mapping algorithm data), which can be done by the shop vendor by his apparatus connecting to the server 207, and storing the algorithm data e.g. on a writable sector of the portable memory containing the movie. Such an apparatus 201 embodiment may e.g. be connected/connectable to a key pad for entering a user-private code etc. Some variants may ask some identification of the user's hardware, e.g. the television writes its code encrypted on a memory stick, which is attached to the apparatus 201 in the shop. Advantageously, if the shop immediately sends some information of the purchase to the server 207, this can aid in regularizing a second time (hopefully in the user's home and not again in the shop), e.g. if the user has forgotten his password.

For simplicity we call gam the algorithm, since no confusion exists with the data specifying it (e.g. at least one coefficient of a power low, or software code prescribing some color transformation etc.). Also the skilled reader will understand that the control unit 202 may comprise (or be connected to) various other units, such as a communication unit arranged to apply the required communication protocol, do data formatting and protecting etc., or a user interface unit allowing it to communicate with the user, and e.g. show a window for secure entry of financial information on its portable display for regularizing an irregular LDR_CONT, etc. It should also be clear how image processing (color mapping, (DCT) (de)compression etc.), can be done, and neither need we dive into details of display driving etc. Note that of course the apparatus 201 may connect to various servers, to allow several owner, coordinated or independently, to specify the mapping data for subparts of e.g. a movie or program. One may e.g. think of material in which material of another provider is interleaved, or even, although some Hollywood producer may own the movie, the mapping for the graphics in some scenes may be delivered from a server of the special effects studio directly, whereas other mapping data may e.g. come from a centralized Disney or Paramount server. It should also be clear what we mean technically with mapping lumas of a first to a second color representation. A luma is a technical code (e.g. Y=[0,255]) which has an association via a tone definition curve to a final luminance, whether e.g. as camera-captured or a display rendering referred. Various alternative technical realizations can exist, e.g. in a linear representation this third color coordinate could be the luminance itself, but a sufficiently technically experienced reader should perfectly understand what it is (for simplicity we pretend the luma ranges are floats (except for LDR_CONT which we assume classical 8 bit with gamma 2.2 etc), but of course one may also e.g. map from some 10 bit to some 15 bit luma definition).

The algorithmic components disclosed in this text may (entirely or in part) be realized in practice as hardware (e.g. parts of an application specific IC) or as software running on a special digital signal processor, or a generic processor, etc. They may be semi-automatic in a sense that at least some user input may be/have been (e.g. in factory, or consumer input, or other human input) present.

It should be understandable to the skilled person from our presentation which components may be optional improvements and can be realized in combination with other components, and how (optional) steps of methods correspond to respective means of apparatuses, and vice versa. The fact that some components are disclosed in the invention in a certain relationship (e.g. in a single figure in a certain configuration) doesn't mean that other configurations are not possible as embodiments under the same inventive thinking as disclosed for patenting herein. Also, the fact that for pragmatic reasons only a limited spectrum of examples has been described, doesn't mean that other variants cannot fall under the scope of the claims. In fact, the components of the invention can be embodied in different variants along any use chain, e.g. all variants of a creation side like an encoder may be similar as or correspond to corresponding apparatuses at a consumption side of a decomposed system, e.g. a decoder and vice versa. Several components of the embodiments may be encoded as specific signal data in a signal for transmission, or further use such as coordination, in any transmission technology between encoder and decoder, etc. The word "apparatus" in this application is used in its broadest sense, namely a group of means allowing the realization of a particular objective, and can hence e.g. be (a small part of) an IC, or a dedicated appliance (such as an appliance with a display), or part of a networked system, etc. "Arrangement" or "system" is also intended to be used in the broadest sense, so it may comprise inter alia a single physical, purchasable apparatus, a part of an apparatus, a collection of (parts of) cooperating apparatuses, etc.

The computer program product denotation should be understood to encompass any physical realization of a collection of commands enabling a generic or special purpose processor, after a series of loading steps (which may include intermediate conversion steps, such as translation to an intermediate language, and a final processor language) to enter the commands into the processor, to execute any of the characteristic functions of an invention. In particular, the computer program product may be realized as data on a carrier such as e.g. a disk or tape, data present in a memory, data traveling via a network connection—wired or wireless—, or program code on paper. Apart from program code, characteristic data required for the program may also be embodied as a computer program product. Such data may be (partially) supplied in any way.

The invention or any data usable according to any philosophy of the present embodiments like video data, may also be embodied as signals on data carriers, which may be removable memories like optical disks, flash memories, removable hard disks, portable devices writeable via wireless means, etc.

Some of the steps required for the operation of any presented method may be already present in the functionality of the processor or any apparatus embodiments of the invention instead of described in the computer program product or any unit, apparatus or method described herein (with specifics of the invention embodiments), such as data input and output steps, well-known typically incorporated processing steps such as standard display driving, etc. We also desire protection for resultant products and similar resultants, like e.g. the specific novel signals involved at any step of the methods or in any subpart of the apparatuses, as well as any new uses of such signals, or any related methods.

It should be noted that the above-mentioned embodiments illustrate rather than limit the invention. Where the skilled person can easily realize a mapping of the presented examples to other regions of the claims, we have for conciseness not mentioned all these options in-depth. Apart from combinations of elements of the invention as combined in the claims, other combinations of the elements are possible. Any combination of elements can be realized in a single dedicated element.

Any reference sign between parentheses in the claim is not intended for limiting the claim, nor is any particular symbol in the drawings. The word "comprising" does not exclude the presence of elements or aspects not listed in a claim. The word "a" or "an" preceding an element does not exclude the presence of a plurality of such elements.

The invention claimed is:

1. An image transformation apparatus arranged to derive a first image (HDR_PRED) with lumas for a first luminance dynamic range from a second image (LDR_CONT) with lumas for a second luminance dynamic range one of the luminance dynamic ranges being is at least twice as large as the other, wherein the derivation comprises tone mapping of lumas of pixels in the second image to lumas of pixels of the first image by applying at least one predefined mapping algorithm (gam) data, the image transformation apparatus comprising:

an input to a data delivery system configured to receive the second image absent the at least one predefined mapping algorithm (gam) data;

a secure data input configured to receive, from a server via a network, the at least one predefined mapping algorithm (gam) data from a plurality of different mapping transformation strategies to recuperate a corresponding mapping luminance dynamic range effect information of the first image; and a control unit arranged to manage an access to the received at least one predefined mapping algorithm (gam) data for rendering of the first image under control of the server per a server-side strategy, wherein the server-side strategy is adapted to supply the at least one predefined mapping algorithm (gam) data, from among the plurality of different mapping transformation strategies configured to achieve different dynamic ranges, based on an analysis of rendering-side situation information that includes at least one aspect of one selected from the group consisting of the second image, the image transformation apparatus, a connected display of the image transformation apparatus for rendering the first image, and a user of the image transformation apparatus.

2. An image transformation apparatus as claimed in claim 1, wherein the control unit is arranged to obtain the at least one predefined mapping algorithm data via the data-secured input only within a predefined time interval before a time of rendering on a display of the first image (HDR_PRED).

3. An image transformation apparatus as claimed in claim 2, wherein the predefined time interval is a couple of seconds.

4. An image transformation apparatus as claimed in claim 1, wherein the control unit is further arranged to send to the server content identification data (id_rend) identifying at least aspects of the second image (LDR_CONT), wherein the server is further responsive to the content identification data (id_rend), per the server-side strategy, for supplying the at least one predefined mapping algorithm (gam) data from among the plurality of different mapping transformation strategies.

5. An image transformation apparatus as claimed in claim 4, in which the control unit is further arranged to send to the server identification data of the image transformation apparatus or of an HDR display.

6. An image transformation apparatus as claimed in claim 1 wherein the control unit is arranged to store the at least one predefined mapping algorithm data in a memory in an encrypted manner.

7. An image transformation apparatus as claimed in claim 1 wherein the control unit is arranged to obtain characterizing information from a user of the first image (HDR_PRED) and to send the characterizing information to the server, wherein the server is further responsive to the characterizing information, per the server-side strategy, for supplying the at least one predefined mapping algorithm (gam) data from among the plurality of different mapping transformation strategies.

8. An image transformation apparatus as claimed in claim 7, wherein the characterizing information includes at least a personal code or biometric data.

9. A predefined mapping algorithm data (gam, gam_enc) supplying server arranged to receive a data connection opening from an image transformation apparatus as claimed in claim 1, and arranged to perform a test based on transmitted content identification data (id_rend) from the image transformation apparatus testing whether the second image (LDR_CONT) is authorized, and arranged to thereupon supply the predefined mapping algorithm data (gam, gam_enc) to the image transformation apparatus.

10. A predefined mapping algorithm data (gam, gam_enc) supplying server as claimed in claim 9, wherein the server is further arranged to perform at least one further test that comprises at least testing whether the image transformation apparatus is an authorized apparatus.

11. A predefined mapping algorithm data (gam, gam_enc) supplying server as claimed in claim 9, wherein the server is further arranged to maintain a communication with the image transformation apparatus of partial information of the predefined mapping algorithm data (gam, gam_enc) transmitted in a precise temporal communication established via the server-side strategy.

12. A predefined mapping algorithm data (gam, gam_enc) supplying server as claimed in claim 9, wherein the server is further arranged to receive from the image transformation apparatus information on at least one aspect of
- the second image (LDR_CONT),
- the image transformation apparatus,
- a connected HDR display for rendering the first image (HDR_PRED),
- optical characteristics of an environment of the HDR display, and
- a user of the image transformation apparatus, and wherein the server is further responsive to the information on the at least one aspect thereof, for determining which, if any, predefined mapping algorithm data (gam, gam_enc) of a set of transformation strategies to send to the image transformation apparatus.

13. A method of deriving a first image (HDR_PRED) of lumas for a first luminance dynamic range from a second image (LDR_CONT) of lumas for a second luminance dynamic range, one of the luminance dynamic range being at least twice as large as the other, wherein the derivation comprises tone mapping of lumas of pixels in the second image into lumas of pixels of the first image by applying at least one predefined mapping algorithm (gam) data, the method comprising:
- obtaining from a data delivery system the second image absent the at least one predefined mapping algorithm (gam) data; and
- managing, via a control unit, an access to the at least one predefined mapping algorithm (gam) data obtained via a secure data input under control of a server via a network, wherein the at least one predefined mapping algorithm (gam) data further being obtained from a plurality of different mapping transformation strategies to recuperate a corresponding mapping luminance dynamic range effect information of the first image under control of the server per a server-side strategy, wherein the server-side strategy is adapted to supply the at least one predefined mapping algorithm (gam) data, from among the plurality of different mapping transformation strategies configured to achieve different dynamic ranges, based on an analysis of rendering-side situation information that includes at least one aspect of one selected from the group consisting of the second image, an image transformation apparatus implementing the method, a connected display of the image transformation apparatus for rendering the first image, and a user of the image transformation apparatus.

14. A method of deriving a first image (HDR_PRED) as claimed in claim 13, further comprising making a private secured connection over the network to the server only within a predefined time interval before a time of rendering on a display of the first image.

15. A method of deriving a first image (HDR_PRED) as claimed in claim 14, further comprising sending, via a control unit at the location of rendering the first image (HDR_PRED), content identification data (id_rend) identifying the second image (LDR_CONT) to the server, wherein the server is responsive to the content identification data (id_rend), per the server-side strategy, for supplying the at least one predefined mapping algorithm (gam) data from among the plurality of different mapping transformation strategies.

16. A method of supplying at least one predefined mapping algorithm data (gam, gam_enc) for transforming a second image (LDR_CONT) graded for rendering on a display of a second luminance dynamic range, into a first image (HDR_PRED) graded for rendering on a display of a second luminance dynamic range, the method comprising:
- providing a source of the at least one predefined mapping algorithm data (gam, gam_enc) from a plurality of different mapping transformation strategies to recuperate a corresponding mapping luminance dynamic range effect information of the first image, the source being connectable to an image transformation apparatus having a control unit arranged to manage an access to the at least one predefined mapping algorithm data under control of the source per a source-side strategy by an owner of artistic content in the second image, wherein the source-side strategy is adapted to supply the at least one predefined mapping algorithm (gam) data, from among the plurality of different mapping transformation strategies configured to achieve different dynamic ranges, based on an analysis of rendering-side situation information that includes at least one aspect of one selected from the group consisting of the second image, the image transformation apparatus, a connected display of the image transformation apparatus for rendering the first image, and a user of the image transformation apparatus; and
- testing, via the source per the source-side strategy, whether the image transformation apparatus is using an authorized second image (LDR_CONT), and responsive to a positive verification in the testing, transmitting to the image transformation apparatus the at least one predefined mapping algorithm data (gam, gam_enc) from the plurality of different mapping transformation strategies.

* * * * *